(12) United States Patent
Yang

(10) Patent No.: US 12,517,362 B2
(45) Date of Patent: Jan. 6, 2026

(54) LIGHT SHORT-FOCUS NEAR-EYE DISPLAY SYSTEM

(71) Applicant: GUANGGAN (SHANGHAI) TECHNOLOGY CO., LTD., Shanghai (CN)

(72) Inventor: Jianming Yang, Shenzhen (CN)

(73) Assignee: GUANGGAN (SHANGHAI) TECHNOLOGY CO., LTD., Shanghai (CN)

( * ) Notice: Subject to any disclaimer, the term of this patent is extended or adjusted under 35 U.S.C. 154(b) by 304 days.

(21) Appl. No.: 18/550,156

(22) PCT Filed: Jan. 13, 2022

(86) PCT No.: PCT/CN2022/071799
§ 371 (c)(1),
(2) Date: Sep. 12, 2023

(87) PCT Pub. No.: WO2022/193808
PCT Pub. Date: Sep. 22, 2022

(65) Prior Publication Data
US 2024/0151979 A1 May 9, 2024

(30) Foreign Application Priority Data
Mar. 19, 2021 (CN) .......................... 202110297398.X

(51) Int. Cl.
*G02B 27/01* (2006.01)
*G02B 27/00* (2006.01)

(52) U.S. Cl.
CPC ..... *G02B 27/0172* (2013.01); *G02B 27/0081* (2013.01); *G02B 27/0149* (2013.01); *G02B 2027/0123* (2013.01); *G02B 2027/015* (2013.01)

(58) Field of Classification Search
CPC ............ G02B 27/0172; G02B 27/0081; G02B 27/0149; G02B 2027/0123; G02B 2207/015
See application file for complete search history.

(56) References Cited

U.S. PATENT DOCUMENTS

| | | | |
|---|---|---|---|
| 2017/0168302 A1 | 6/2017 | Mcdowall et al. | |
| 2017/0227777 A1* | 8/2017 | Carollo | G02B 27/148 |
| | (Continued) | | |

FOREIGN PATENT DOCUMENTS

| | | |
|---|---|---|
| CN | 108319018 A | 7/2018 |
| CN | 111399228 A | 7/2020 |
| | (Continued) | |

OTHER PUBLICATIONS

International Search Report and Written Opinion for International Application No. PCT/CN2022/071799 mailed Mar. 28, 2022.
(Continued)

*Primary Examiner* — Dennis P Joseph
(74) *Attorney, Agent, or Firm* — Ballard Spahr LLP

(57) ABSTRACT

A portable short-focus near-eye display system is provided, which relates to the field of near-eye display technologies, and solves the problem of contradiction between optical performance and volumes in an existing AR technology. The system includes a microdisplay, an inner lens, and a concave partial reflector. The inner lens is closer to a pupil position, and the concave partial reflector is farther away from the pupil position. The microdisplay includes a rotating linear display or a transparent display. Through multiple reflections, an optical path is folded, so that a distance between a convex partial reflector and the concave partial reflector is shortened, and a thickness of glasses can be maximally reduced, thereby achieving thinning.

10 Claims, 10 Drawing Sheets

(56) References Cited

U.S. PATENT DOCUMENTS

| | | | |
|---|---|---|---|
| 2017/0242258 A1* | 8/2017 | Edwards | G02B 27/0172 |
| 2018/0101020 A1* | 4/2018 | Gollier | G02B 27/022 |
| 2019/0086675 A1* | 3/2019 | Carollo | G02B 27/288 |
| 2019/0285902 A1* | 9/2019 | Ouderkirk | G02B 27/0955 |
| 2019/0377183 A1* | 12/2019 | Sharp | G02B 27/283 |
| 2020/0041790 A1 | 2/2020 | Martinez et al. | |
| 2020/0333596 A1 | 10/2020 | Yoon et al. | |
| 2021/0005123 A1 | 1/2021 | Valente et al. | |

FOREIGN PATENT DOCUMENTS

| | | |
|---|---|---|
| CN | 111474728 A | 7/2020 |
| CN | 212060744 U | 12/2020 |
| CN | 112799232 A | 5/2021 |
| CN | 112904563 A | 6/2021 |
| CN | 214540237 U | 10/2021 |
| CN | 115639675 A | 1/2023 |
| JP | H07175009 A | 7/1995 |
| JP | 2013097215 A | 5/2013 |
| JP | 2018511065 A | 4/2018 |

OTHER PUBLICATIONS

Extended European Search Report for European Application No. 22770170.3 mailed Aug. 1, 2024.

Office Action for Japanese Patent Application No. 2023-554335 mailed Aug. 26, 2024.

* cited by examiner

LIGHT SHORT-FOCUS NEAR-EYE DISPLAY SYSTEM

CROSS-REFERENCE TO RELATED APPLICATIONS

This application is a U.S. national stage of International Patent Application No. PCT/CN2022/071799, filed on Jan. 13, 2022, which claims priority to Chinese Patent Application No. 202110297398.X filed on Mar. 19, 2021, entitled "PORTABLE SHORT-FOCUS NEAR-EYE DISPLAY SYSTEM". The contents of both the applications are hereby incorporated by reference in their entireties.

TECHNICAL FIELD

The present disclosure relates to the field of near-eye display technologies, and in particular, to a portable short-focus near-eye display system.

BACKGROUND

Near-eye displays can provide users with a super-large 3D image, and at the same time, a displayed image can be integrated with a real environment, which has a very wide range of applications in daily life and industrial fields.

At present, optical waveguide AR glasses are the most promising, which can achieve an appearance similar to that of ordinary glasses. However, due to constraints of a refractive index, diffraction efficiency, and the like, it is difficult to break through a field of view, generally around 500 diagonally, with the biggest disadvantage that ultra-low energy efficiency may lead to lots of power consumption of the entire system. The present disclosure solves the above problems by using spherical symmetry. Based on a spherical symmetry technology, the applicant has previously applied for a series of patented technologies (Patent Numbers: 202020742439.2, 202120312789.X, and 202110154039.9). Although the above patents have achieved a very ideal optical effect, the total thickness is relatively large.

SUMMARY

A portable short-focus near-eye display system is provided. The portable short-focus near-eye display system includes a microdisplay, an inner lens, and a concave partial reflector. The inner lens is closer to a pupil position, and the concave partial reflector is farther away from the pupil position. The microdisplay includes a rotating linear array microdisplay or a transparent microdisplay, and the inner lens is a convex reflector. The microdisplay is arranged between the inner lens and the pupil position, arranged between the inner lens and the concave partial reflector, or arranged on a convex side of the concave partial reflector. When the microdisplay is arranged between the inner lens and the pupil position, the microdisplay emits light away from the pupil position, and a number of reflections of the light emitted by the microdisplay between the inner lens and the concave partial reflector is greater than or equal to 3. When the microdisplay is arranged between the inner lens and the concave partial reflector, the microdisplay emits light away from the pupil position or toward the pupil position, and a number of reflections of the light emitted by the microdisplay between the inner lens and the concave partial reflector is greater than or equal to 3. When the microdisplay is arranged on the convex side of the concave partial reflector, the microdisplay emits light toward the pupil position, and a number of reflections of the light emitted by the microdisplay between the inner lens and the concave partial reflector is greater than or equal to 4.

Further, a concave surface or a convex surface of the inner lens is configured as a polarizing reflective surface. A phase retardation plate is added between the inner lens and the concave partial reflector. An ambient light circular polarizer is arranged on the convex side of the concave partial reflector, and the ambient light circular polarizer is configured to change natural ambient light into first circularly polarized ambient light. The first circularly polarized ambient light, after passing through the phase retardation plate, becomes s-type linearly polarized ambient light and enters a human eye.

Further, the number of reflections of the light emitted by the microdisplay between the inner lens and the concave partial reflector is set to 3. A concave surface or a convex surface of the inner lens is configured as a polarizing reflective surface. When the microdisplay is located between the inner lens and the concave partial reflector, a phase retardation wave plate is placed between the microdisplay and the inner lens. When the microdisplay is arranged between the inner lens and the pupil position, a phase retardation wave plate is placed between the inner lens and the concave partial reflector.

Further, the linear array display includes light-emitting pixels, transparent wires, and a display driver chip. The transparent wires connect the light-emitting pixels and the display driver chip. A distance between the light-emitting pixels and the display driver chip is greater than 1 mm.

The light-emitting pixels are arranged in a manner of a line, half of a line, two lines in a cross-shaped arrangement, or four lines in a *-shaped arrangement.

Further, regions on both sides of the light-emitting pixels are configured as transparent regions, partial reflective surfaces, or polarizing reflective surfaces. The regions on both sides of the light-emitting pixels, when being the partial reflective surfaces, replace the concave partial reflector. The regions on both sides of the light-emitting pixels, when being the polarizing reflective surfaces, replace the inner lens.

The number of reflections of the light emitted by the microdisplay between the inner lens and the concave partial reflector is set to 3. The concave partial reflector is configured as a strip-shaped partial reflector that rotates synchronously with the linear array microdisplay. An outer protective lens is placed on one side of the strip-shaped partial reflector.

Further, the number of reflections of the light emitted by the microdisplay between the inner lens and the concave partial reflector is set to 4. A concave surface or a convex surface of the inner lens is configured as a polarizing reflective surface. The inner lens is configured with a strip shape in a same direction as a pixel arrangement of the linear array microdisplay. The concave partial reflector is configured as a strip-shaped partial reflector. The inner lens, the strip-shaped partial reflector, and the linear array microdisplay rotate synchronously. A center of the inner lens is coated with a strip-shaped central total reflection film, and a width of the central total reflection film is smaller than a diameter of a human pupil. A phase retardation wave plate is placed between the inner lens and the concave partial reflector, and a polarization film layer is placed in front of the light-emitting pixels of the linear array microdisplay.

Further, the regions on both sides of the light-emitting pixels of the linear array microdisplay are configured as the partial reflective surfaces for replacing the strip-shaped partial reflector. The linear array microdisplay rotates synchronously with the inner lens. An inner protective lens is added to a left side of the inner lens, and an outer protective lens is added to a side of the linear array microdisplay away from the pupil. The inner protective lens and the outer protective lens are each provided with a rotating shaft.

Further, when the number of reflections of the light emitted by the microdisplay between the inner lens and the concave partial reflector is more than 4, one surface of the inner lens is configured as a polarizing reflective surface, a phase retardation wave plate is placed between the inner lens and the concave partial reflector, and a partial reflective surface of the concave partial reflector is configured as a surface that dynamically adjusts a reflection circular polarization direction. The microdisplay is controlled to emit pulsed circularly polarized light. The concave partial reflector is configured to keep a reflection circular polarization direction unchanged. The partial reflective surface of the concave partial reflector is configured as an ordinary mirror when the number of light reflections reaches a set number, and the light, after being reflected by the ordinary mirror, enters a human eye.

Further, when the number of reflections of the light emitted by the microdisplay between the inner lens and the concave partial reflector is more than 4, one surface of the inner lens is configured as a switchable mirror. The microdisplay is controlled to emit pulsed light. The switchable mirror reflects the light when the number of reflections does not reach a set number, and the switchable mirror becomes transmissive to transmit the light into a human eye when the number of reflections reaches the set number.

Further, the inner lens and the concave partial reflector are combined as an integrated lens. The microdisplay is configured to emit light toward one side of the integrated lens. An inner surface of the integrated lens is configured as a switchable mirror. The light emitted by the microdisplay is reflected between the inner surface of the integrated lens and the outer surface of the integrated lens. The light enters the human eye through the inner surface of the integrated lens when the number of reflections reaches a set number.

Figure 1:
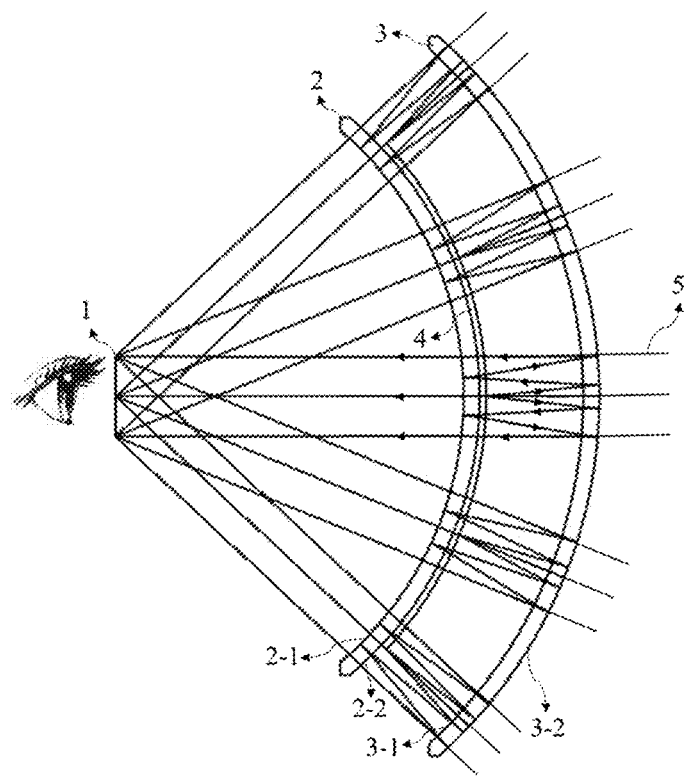
FIG. 1 is an optical path diagram of a portable short-focus near-eye display system with 3 reflections in which a microdisplay is provided on the right side of an inner lens according to the present disclosure.

In the figures, 1: pupil position, 2: inner lens, 2-1: concave surface, 2-2: convex surface, 2-3: extension end of inner lens, 2-4: rotating shaft, 3: concave partial reflector, 3-1: inner side surface, 3-2: outer side surface, 3*a*: strip-shaped partial reflector, 4: microdisplay, 4*a*: linear array microdisplay, 4*b*: transparent microdisplay, 4*a*-1: light-emitting pixel of linear array microdisplay, 4*a*-2: transparent wire, 4*a*-3: linear array display driver chip, 4*a*-4: regions on both sides of light-emitting pixels, 4*a*-5: front film layer for light-emitting pixels, 4*a*-6: extension end of linear array microdisplay, 4*a*-7: inner magnetic ring of linear array microdisplay, 4*a*-8: rotating concave ring, 5: ambient light, 5-1: natural ambient light, 5-2: s-type linearly polarized ambient light, 5-3: first circularly polarized ambient light, 6: phase retardation wave plate, 7: light, 7-1: s-type linearly polarized light, 7-2: p-type linearly polarized light, 7-3: first circularly polarized light, 7-4: second circularly polarized light, 7-5: unlimited polarized light, 8: restricting magnetic ring, 9: supplementary function board, 10: inner protective lens, 10-1: rotating shaft of inner protective lens, 10-2: extension end of inner protective lens, 11: outer protective lens, 11-1: rotating shaft of outer protective lens, 12: frame, 13: central total reflection film, 14: integrated lens, 14-1: inner surface of integrated lens, 14-2: outer surface of integrated lens, 15: ambient light circular polarizer.

DETAILED DESCRIPTION OF THE EMBODIMENTS

The technical solutions in embodiments of the present disclosure will be described clearly and completely below with reference to the accompanying drawings in the embodiments of the present disclosure. Apparently, the described embodiments are merely some of rather than all of the embodiments of the present disclosure. All other embodiments acquired by those of ordinary skill in the art without creative efforts based on the embodiments of the present disclosure shall fall within the protection scope of the present disclosure.

It is to be noted that, when one component is referred to as "connected to" another component, it may be directly connected to another component or an intermediate component may exist. When one component is referred to as "fixed to" another component, it may be directly fixed to another component or an intermediate component may exist. "Left side" is the side facing a pupil position, and "right side" is the side away from a pupil and facing an environment.

Unless defined otherwise, all technical and scientific terms used in this implementation have the same meanings as would generally understood by those skilled in the technical field of the present disclosure. The terms used in the specification of the present disclosure are only for the purpose of describing specific embodiments, and are not intended to limit the present disclosure.

This implementation is described with reference to FIG. 1 to FIG. 11. A portable short-focus near-eye display optical system includes a microdisplay 4, an inner lens 2, and a concave partial reflector 3. The microdisplay 4 is located on the left side of the inner lens 2, or located between the inner lens 2 and the concave partial reflector 3. The inner lens 2 is closer to a pupil position 1, and the concave partial reflector 3 is farther away from the pupil position 1. The inner lens 2 is a convex reflector.

Referring to FIG. 1, when the microdisplay 4 is located between the inner lens 2 and the concave partial reflector 3, the microdisplay 4 emits light away from the pupil position 1, and the number of reflections of the light emitted by the microdisplay between the inner lens 2 and the concave partial reflector 3 is 3.

The light emitted by the microdisplay 4 is reflected by the concave partial reflector 3. Since the microdisplay 4 is a linear array or transparent, part of the reflected light can pass through the microdisplay 4 and reach the inner lens 2. A concave surface 2-1 or a convex surface 2-2 of the inner lens 2 has certain reflectivity, and can reflect the light. The reflected light reaches the concave partial reflector 3 after passing through the microdisplay 4 again. The concave partial reflector 3 reflects the light again, and the light then reaches a human eye through the inner lens 2 after passing through the microdisplay 4.

Figure 2:
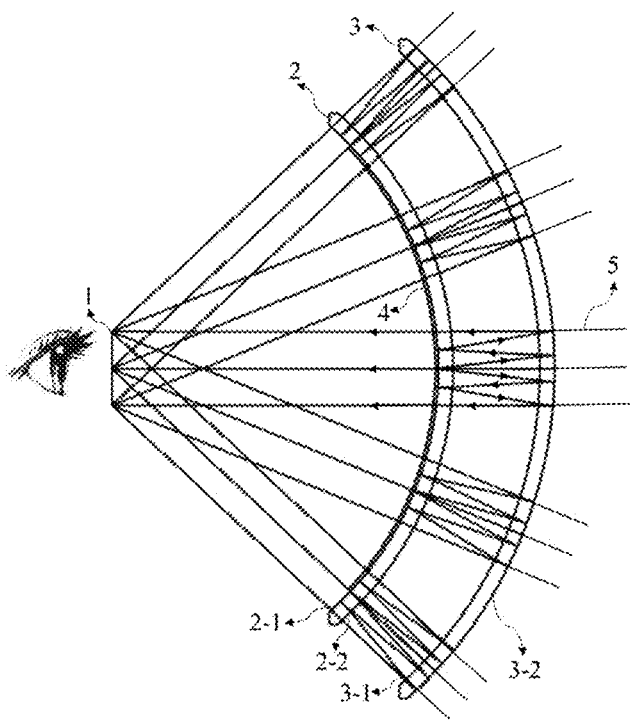
FIG. 2 is an optical path diagram of another portable short-focus near-eye display system with 3 reflections in which a microdisplay is provided on the left side of an inner lens, which is different from that in FIG. 1.

Referring to FIG. 2, when the microdisplay 4 is located on the left side (the concave surface 2-1) of the inner lens 2, the microdisplay 4 emits light away from the pupil position 1, and the number of reflections of the light between the inner lens 2 and the concave partial reflector 3 is 3.

The light emitted by the microdisplay first passes through the inner lens 2, and then is reflected by the concave partial reflector 3. The reflected light reaches the inner lens 2 again. The concave surface 2-1 or the convex surface 2-2 of the inner lens 2 has certain reflectivity, and can reflect the light. After the reflected light reaches the concave partial reflector 3, the light is reflected again. The reflected light reaches the human eye after passing through the inner lens 2 and the microdisplay 4.

In this implementation, the microdisplay 4 includes a rotating linear array microdisplay 4*a* or a transparent microdisplay 4*b*. Pixels of the transparent microdisplay 4*b* are distributed on a spherical surface. The inner lens 2 is closer to the pupil position 1, and the concave partial reflector 3 is farther away from the pupil position 1. One surface of the concave partial reflector 3, i.e., an inner side surface 3-1 or an outer side surface 3-2 has certain reflectivity such as 50%, and certain transmittance such as 50%. For a determined wavelength, such as within a visible light range, the sum of the transmittance and the reflectance is close to or equal to 1.

This implementation is described with reference to FIG. 3 and FIG. 4. In this implementation, since the light is transmitted back and forth, light energy is constantly lost, and there may be some stray light. One surface of the inner lens 2, i.e., the concave surface 2-1 or the convex surface 2-2, is configured as a polarizing reflective surface that reflects one type of polarized light and transmits another type of polarized light with a polarization direction perpendicular to that of the reflected light. For example, a metal wire grid polarizing film has the above characteristics, which can be attached to a surface of an optical lens. A phase retardation plate 6 is added to the system to improve light energy efficiency. Preferably, the phase retardation plate 6 is a quarter-wave plate.

There are two different cases depending on the position of the microdisplay 4. As shown in FIG. 3(*a*), when the microdisplay 4 is located between the inner lens 2 and the concave partial reflector 3, the phase retardation wave plate 6 is placed between the microdisplay 4 and the inner lens 2, which may be attached to the convex surface 2-2 of the inner lens. As shown in FIG. 3(*b*) which shows path and polarization changes, the microdisplay 4 emits first circularly polarized light 7-3. After being reflected by the concave partial reflector 3, the rotation direction of the light changes, such as from left rotation to right rotation, and the light becomes second circularly polarized light 7-4. The second circularly polarized light 7-4 passes through the phase retardation wave plate 6 and becomes p-type linearly polarized light 7-2, which is completely reflected by a polarizing reflective film attached to one surface of the inner lens 2. The reflected p-type linearly polarized light 7-2 passes through the phase retardation wave plate 6 and becomes the second circularly polarized light 7-4 again. The second circularly polarized light 7-4, after being reflected by the concave partial reflector 3, changes a rotation direction to become the first circularly polarized light 7-3. The first circularly polarized light 7-3 passes through the phase retardation wave plate 6 and becomes s-type linearly polarized light 7-1. The s-type linearly polarized light 7-1 can completely pass through the polarizing reflective film and reach the pupil position 1. Therefore, a display effect with high efficiency and low stray light is achieved. The p-type and s-type linearly polarized light are named for the convenience of description and do not limit directions thereof.

As shown in FIG. 4(a), when the microdisplay 4 is located on the left side of the inner lens 2, the phase retardation wave plate 6 is placed between the inner lens 2 and the concave partial reflector 3, which may also be attached to the convex surface 2-2 of the inner lens or the inner side surface 3-1 of the concave partial reflector 3. As shown in FIG. 4(b) which is a diagram showing optical path and polarization changes, the microdisplay 4 emits unlimited polarized light 7-5. The unlimited polarized light 7-5 is light whose polarization form is not limited, such as natural light, circularly polarized light, elliptically polarized light, or linearly polarized light. However, when the light is linearly polarized light, a polarization direction should not be perpendicular to the transmission direction of the polarizing reflective film. Otherwise, the light cannot pass through the polarizing reflective film. The unlimited polarized light 7-5 passes through the polarizing reflective film attached to the inner lens 2 and becomes the s-type linearly polarized light 7-1, which passes through the phase retardation wave plate 6 and becomes the first circularly polarized light 7-3. The first circularly polarized light 7-3, after being reflected by the concave partial reflector 3, changes the rotation direction, such as from left rotation to right rotation, and becomes the second circularly polarized light 7-4. The second circularly polarized light 7-4 passes through the phase retardation wave plate 6 and becomes the p-type linearly polarized light 7-2, which is completely reflected by the polarizing reflective film attached to one surface of the inner lens 2. The reflected p-type linearly polarized light 7-2 passes through the phase retardation wave plate 6 and becomes the second circularly polarized light 7-4 again. The second circularly polarized light 7-4, after being reflected by the concave partial reflector 3, changes the rotation direction to become the first circularly polarized light 7-3. The first circularly polarized light 7-3 passes through the phase retardation wave plate 6 and becomes the s-type linearly polarized light 7-1. The s-type linearly polarized light 7-1 completely passes through the polarizing reflective film and reaches the pupil position 1. Therefore, a display effect with high efficiency and low stray light is achieved. This manner is very suitable for a case where the microdisplay is a transparent display 4b, because there is no specific requirement on the polarization of the light emitted by the microdisplay. However, in order to reduce direct light from the transparent display 4b toward the human eye, a dynamic light-shielding layer may be added to block the light.

In this implementation, in order to achieve uniformity of clarity of a displayed image, the inner lens 2, the concave partial reflector 3, and the microdisplay 4 are distributed on concentric spherical surfaces, and the spherical center is at the center of the pupil position 1. Since the human eye has a zoom adjustment function, a certain degree of movement of each component or change of a surface shape is allowed. An additional function of this movement is to adapt to a degree of myopia and realize dynamic zoom. For example, a relative distance between the inner lens 2 and the concave partial reflector 3 may be dynamically adjusted to realize dynamic zoom. Generally, the zoom function may be realized by arranging a voice coil motor.

Optical design parameters when the number of reflections is 3 and the microdisplay 4 is between the inner lens 2 and the concave partial reflector 3 are listed in the following table. The parameters start from a position of a virtual image. During the folds, since the positions and shapes of the devices do not change, the parameters are only listed once.

| Surface label and surface type | Radius of curvature (mm) | Thickness (mm) | Material |
| --- | --- | --- | --- |
| Virtual image | ∞ | −1500 | — |
| Pupil position | ∞ | 21.2 | Air |
| 2-1 sphere | −21.2 | 1 | PMMA |
| 2-2 sphere | −22.2 | 6.8 | Coated reflective film, air |
| 3-1 sphere | −29 | 1 | PMMA |
| 3-2 sphere | −30 | −7.64 | Coated reflective film |
| 4 sphere | −22.36 | — | — |

Optical design parameters when the microdisplay 4 is on the left side of the inner lens 2 are listed in the following table. The parameters start from a position of a virtual image. During the folds, since the positions and shapes of the devices do not change, the parameters are only listed once.

| Surface label and surface type | Radius of curvature (mm) | Thickness (mm) | Material |
| --- | --- | --- | --- |
| Virtual image | ∞ | −1500 | — |
| Pupil position | ∞ | 21.6 | Air |
| 2-1 sphere | −21.6 | 1 | BK7 |
| 2-2 sphere | −22.6 | 6.4 | Coated reflective film, air |
| 3-1 sphere | −29 | 1 | BK7 |
| 3-2 sphere | −30 | −8.75 | Coated reflective film |
| 4 sphere | −21.25 | — | — |

If one surface of the inner lens 2 participates in the generation of a virtual image, the curvature of the other surface may be changed as a surface for myopia correction to suit the degree of the user. Two surfaces of the concave partial reflector 3 may be treated in the same manner to adjust the degree.

In order to improve energy utilization, one surface of the concave partial reflector 3 may be coated with a reflective filter film. The film is designed according to a light-emitting wavelength of the microdisplay 4. The reflective filter film has high reflectivity for a light-emitting central wavelength of the microdisplay 4, for example, more than 90%, and has high transmittance for wavelengths other than the light-emitting central wavelength, for example, more than 90%. Such a design can improve the brightness of both the ambient light and the virtual image. The reflective filter film may be a dielectric film layer, a dielectric metal composite film layer, a holographic film layer, or a microstructure film layer.

Figure 5:
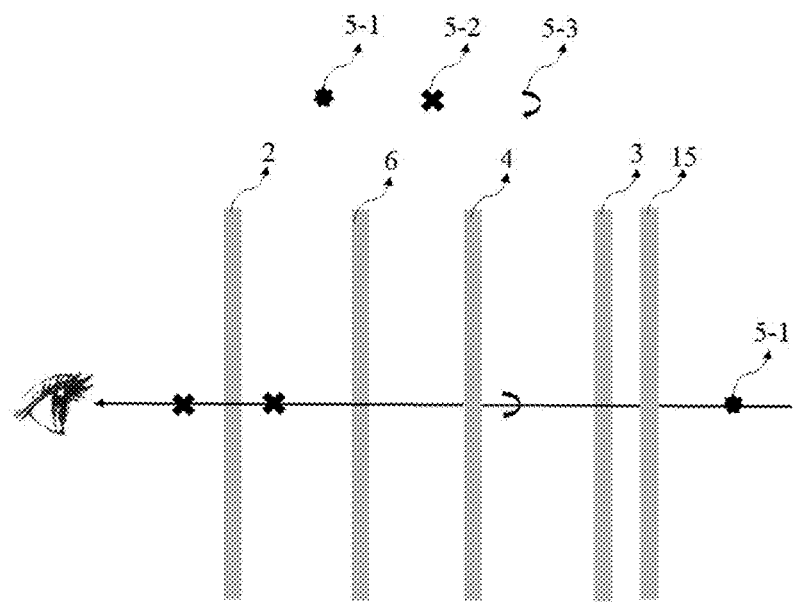
FIG. 5 is a schematic diagram in which circular polarization is added to an outer side of a concave partial reflector to eliminate ambient stray light according to the present disclosure.

This implementation is described with reference to FIG. 5. When the polarizing reflective film is added to the inner lens 2, part of the ambient light may be reflected, and the reflected ambient light may be reflected by the concave partial reflector 3 again, which passes through the inner lens 2 and becomes stray light after passing through the phase retardation plate 6. In order to eliminate the stray light, an ambient light circular polarizer 15 may be placed on the right side of the concave partial reflector 3 to change the ambient light into the first circularly polarized light 7-3, so that the first circularly polarized light passes through the phase retardation plate 6 again and becomes the s-type linearly polarized light 7-1, so as to directly enter the human eye. In this way, formation of stray light by the ambient light can be prevented. When the concave partial reflector 3 is coated with a reflective filter film corresponding to the light-emitting wavelength of the microdisplay, there is no need to arrange the ambient light circular polarizer 15 on the outer side of the concave partial reflector 3, because the light reflected by the polarizing reflective film on the inner lens 2 may pass through the concave partial reflector 3 and no stray light may be formed.

Figure 6:
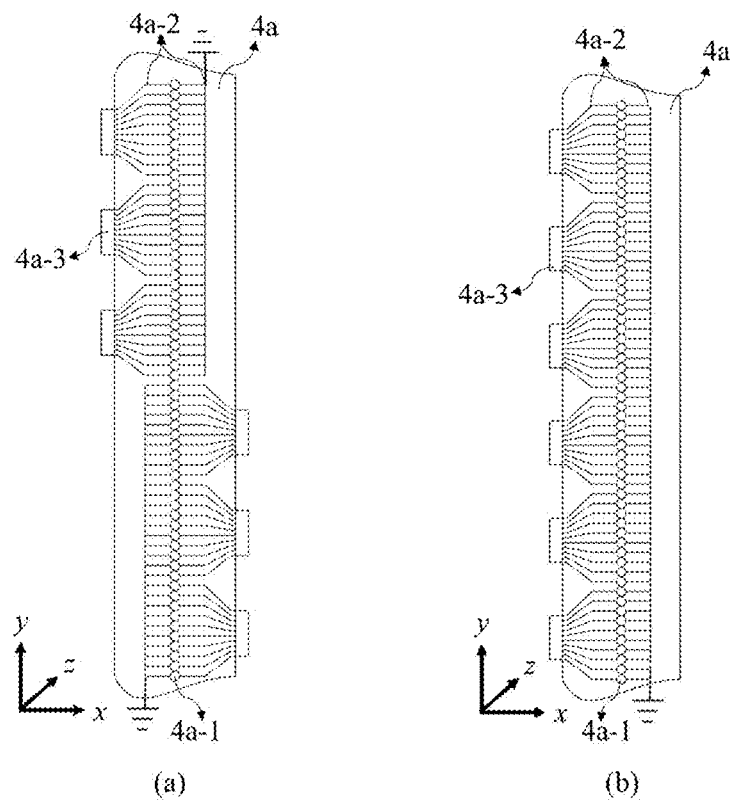
FIG. 6 is a structural diagram of a linear array microdisplay according to the present disclosure; (a) is a schematic diagram of mirror symmetry of upper and lower parts of the linear array microdisplay on a y-x plane; and (b) is a schematic diagram of symmetry of upper and lower parts of the linear array microdisplay on the y-x plane.
Figure 7:
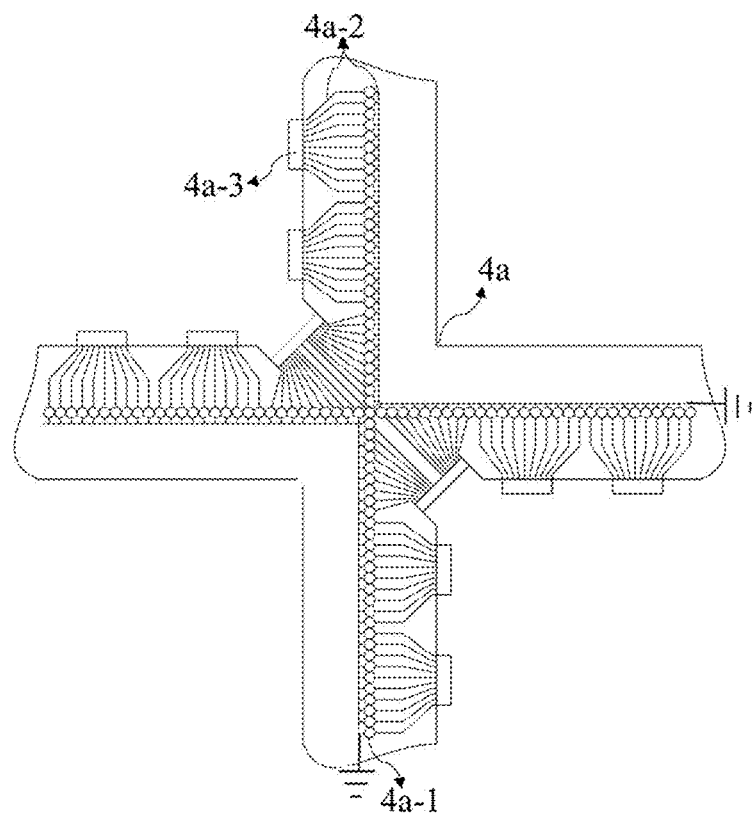
FIG. 7 is a structural diagram of a cross-shaped linear array display according to the present disclosure.

This implementation is described with reference to FIG. 6 to FIG. 8. In this implementation, when the microdisplay 4 is a linear array display, a smaller width of the linear array display is better, such as less than 1 mm. When a silicon base is used for manufacturing, driver chips may be arranged under the light-emitting pixels. When it is difficult to manufacture a linear array display with a small width, the entirety may be widened through transparent wires without blocking sight. As shown in FIG. 6 which shows a new linear array display structure proposed in this implementation. Light-emitting pixels 4a-1 of the linear array microdisplay and linear array display driver chips 4a-3 are connected by transparent wires 4a-2. The distance between the light-emitting pixel 4a-1 and the display driver chip 4a-3 is greater than 1 mm.

Where there are more pixels, such as more than 1000, a plurality of linear array display driver chips 4a-3 may be used to control a part of pixels respectively, such as 200 pixels. In this way, a size of a single control chip can be reduced, and the difficulty of wiring can be reduced. Certainly, a structure in which a single chip drives all the pixels is not excluded. Since the linear array display driver chip 4a-3 is generally opaque, the distance between the light-emitting pixel 4a-1 of the linear array microdisplay and the linear array display driver chip 4a-3 may be increased through the transparent wire 4a-2, such as 5 mm. In this case, the linear array display driver chip 4a-3 is not at a middle position, and due to a visual retention effect, the linear array display driver chip 4a-3 will disappear from vision when rotating, preventing a shading effect. FIG. 6(a) shows an arrangement of mirror symmetry of upper and lower parts of the light-emitting pixels 4a-1, and FIG. 6(b) shows an arrangement of symmetry of upper and lower parts of the light-emitting pixels 4a-1. Due to the rotating display, a complete image may also be formed by a one-round rotation of a half strip of the light-emitting pixels. FIG. 7 shows a linear array display arranged in a cross shape, in which the transparent wires 4a-2 are also used, and the linear array display driver chip 4a-3 may be placed on a side edge to prevent shading. The cross arrangement can increase the brightness of the rotating image and can also reduce the rotational speed required for rotation. Similarly, a *-shaped arrangement including four lines may be provided. Details are not described herein.

Figure 8:
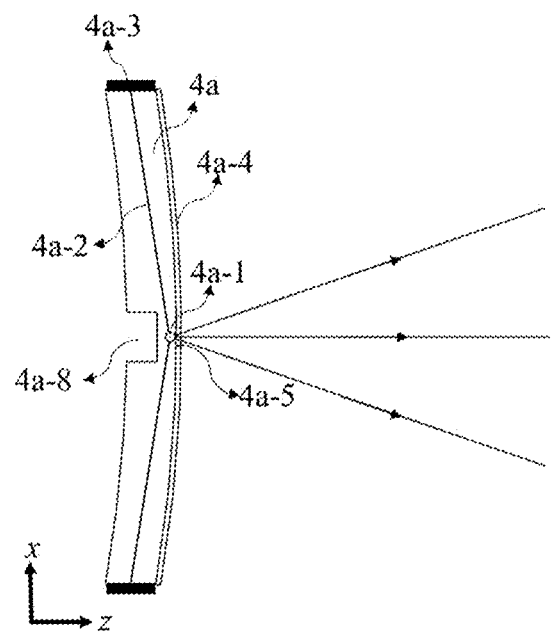
FIG. 8 is a schematic sectional view of an x-z plane of the linear array microdisplay.

FIG. 8 is a schematic sectional view of an x-z plane of the linear array microdisplay. Regions 4a-4 on both sides of the light-emitting pixels may be non-functional transparent regions, or may function as the inner lens 2, i.e., configured as polarizing reflective surfaces. The inner lens 2 may be replaced.

Figure 3:
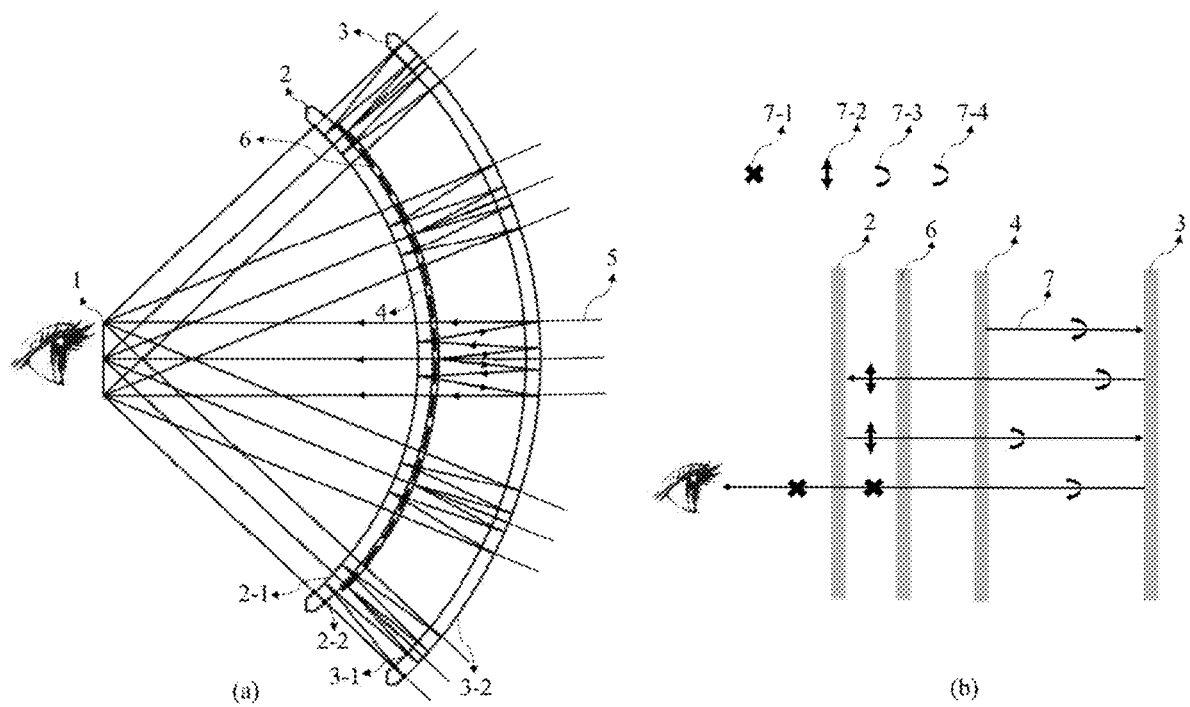
FIG. 3 is an optical path diagram of a portable short-focus near-eye display system with 3 reflections in which a phase retardation wave plate is added and a microdisplay is provided on the right side of an inner lens according to the present disclosure.
Figure 4:
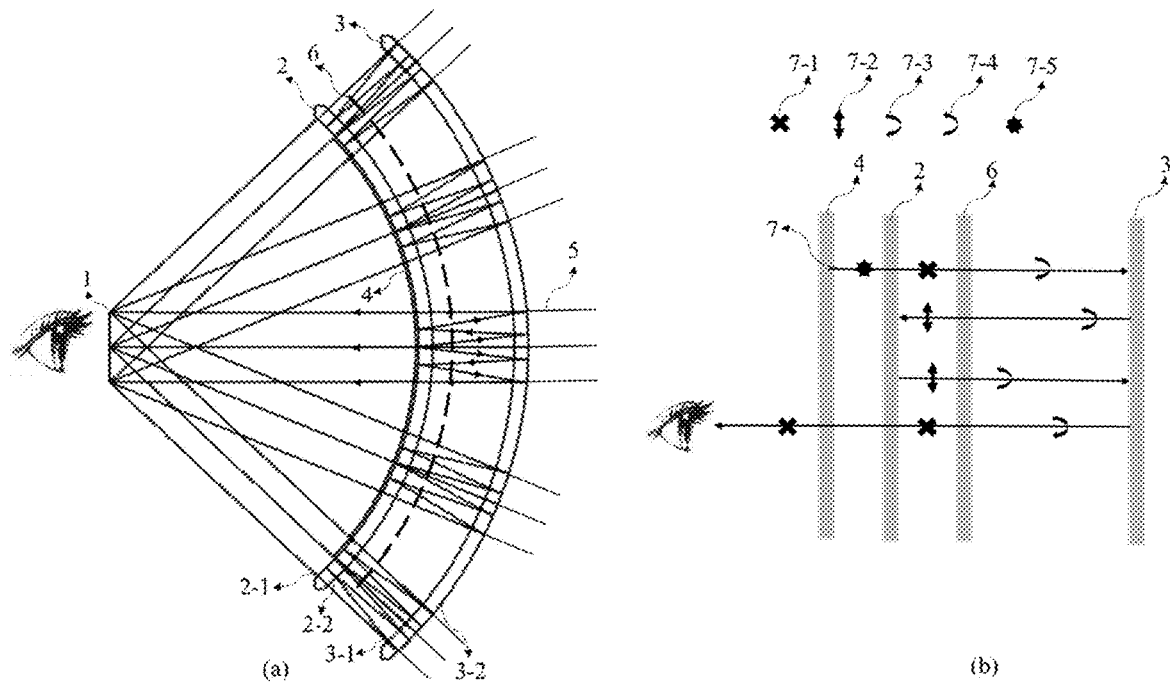
FIG. 4 is an optical path diagram of a portable short-focus near-eye display system with 3 reflections in which a phase retardation wave plate is added and a microdisplay is provided on the left side of an inner lens according to the present disclosure.

In order to improve energy efficiency and reduce stray light, in comparison with FIG. 3 and FIG. 4, a front film layer 4a-5 for the light-emitting pixels may be a circular polarizing film or a linear polarizing film to change characteristics of the emitted light, and a size thereof is generally larger than a length covered by a light-emitting angle ensuring the exit pupil diameter of the system. A rotating concave ring 4a-8 is arranged on a back side of the center of the light-emitting pixels for rotation.

Figure 9:
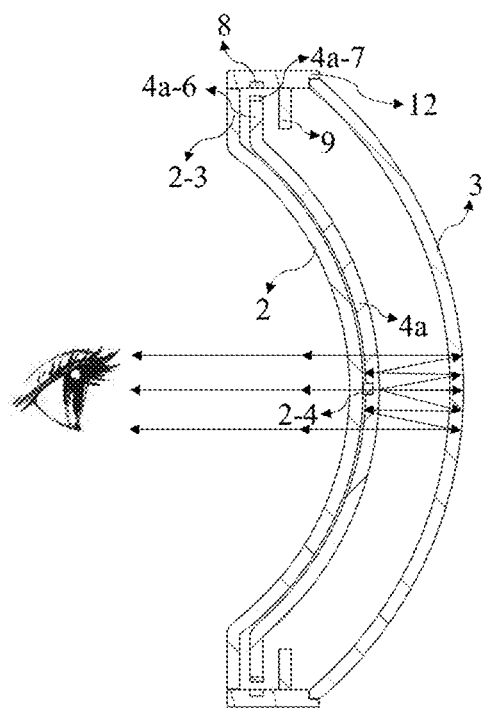
FIG. 9 is a diagram of an optical path and a mounting structure of the linear array microdisplay with no reflective film layer on two sides.

This implementation is described with reference to FIG. 9 and FIG. 10. When the microdisplay 4 is a linear array display, FIG. 9 is a schematic assembly diagram. A rotating shaft 2-4 may be provided at the center of the inner lens 2 to limit the radial movement of the linear array microdisplay 4a. The central rotating shaft may be transparent to reduce central shading or may be opaque. However, a smaller size is better, such as a diameter of 0.5 mm. A fixed position of the rotating shaft may be on the inner lens 2, or on the linear array microdisplay 4a. Similar to a gemstone bearing in a watch, a material at the rotating position may be gemstones, so as to prolong a lifetime and improve precision. At an edge of the linear array microdisplay 4a is an extension end 4a-6a of the linear array microdisplay on which a permanent magnet is configured to be driven and rotated as a rotor. A wireless power supply receiving coil is configured to receive electric energy and supply power to a light-emitting device and a drive circuit. A photoelectric position detector such as an encoder is configured to acquire a precise position of rotation in real time, and other required peripheral electronic devices such as capacitors and inductors are further arranged. An inner magnetic ring 4a-7 of the linear array microdisplay may be fixed to an outer side of the extension end 4a-6 of the linear array microdisplay. An outer side of the inner magnetic ring 4a-7 of the linear array microdisplay is fixed to a frame 12. A restricting magnetic ring 8 is placed on the frame. The restricting magnetic ring 8 is in no contact with the inner magnetic ring 4a-7 of the linear array microdisplay, and the axial movement of the microdisplay 4 is restricted through a magnetic force. A drive coil, a wireless power supply coil, a position calibration ring, etc., may be arranged at an extension end 2-3 of the inner lens. The above devices may alternatively be separately placed on a supplementary function board 9 on which one or all of the drive coil, the wireless power supply coil, and the position calibration ring are arranged. The supplementary function board 9 is fixed to the frame 12.

Figure 10:
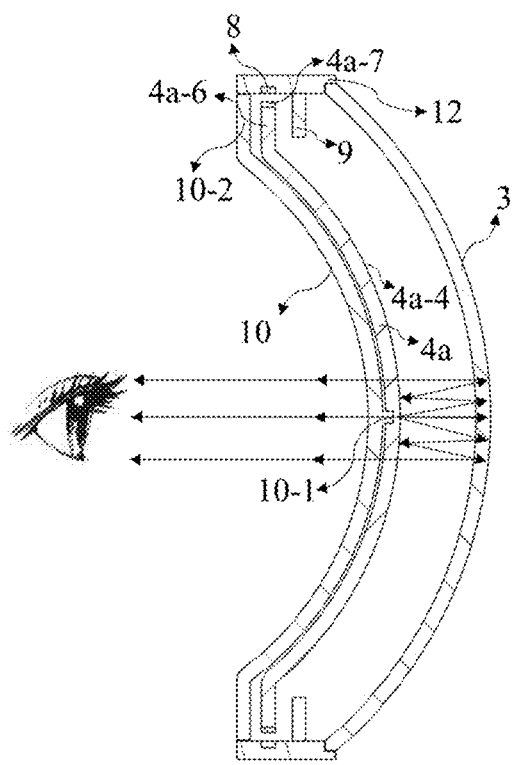
FIG. 10 is a diagram of an optical path and a mounting structure of the linear array microdisplay with a reflective film layer.

As shown in FIG. 10, regions 4a-4 on both sides of the light-emitting pixel of the linear array microdisplay 4a, when configured as partial reflective surfaces or polarizing reflective surfaces, can reflect light. In this case, the reflective film replaces the inner lens 2 to reflect light. Therefore, the inner lens 2 may be changed into a non-reflective inner protective lens 10 to protect a rotating structure and provide rotating support through a rotating shaft 10-1 of the inner protective lens in the middle thereof.

Figure 11:
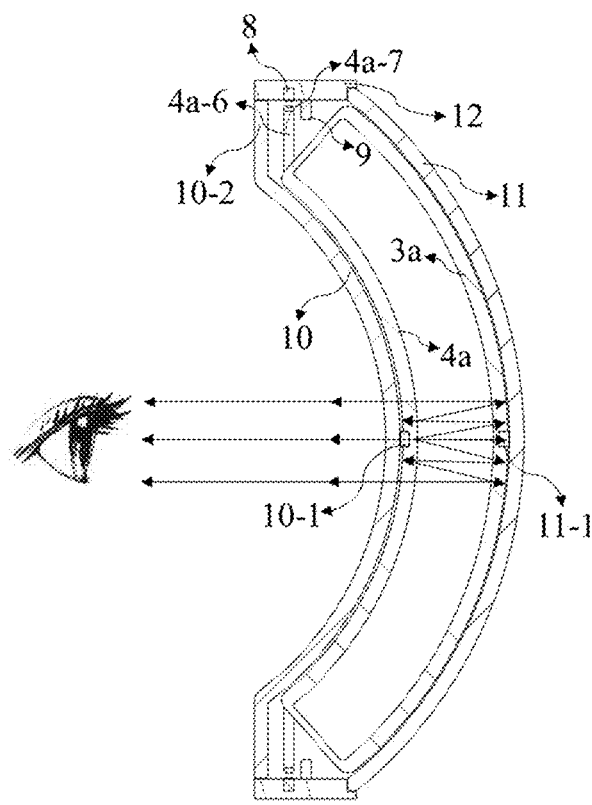
FIG. 11 is a diagram of an optical path and a structure of the linear array microdisplay synchronously rotating with a strip-shaped concave reflector.
Figure 12:
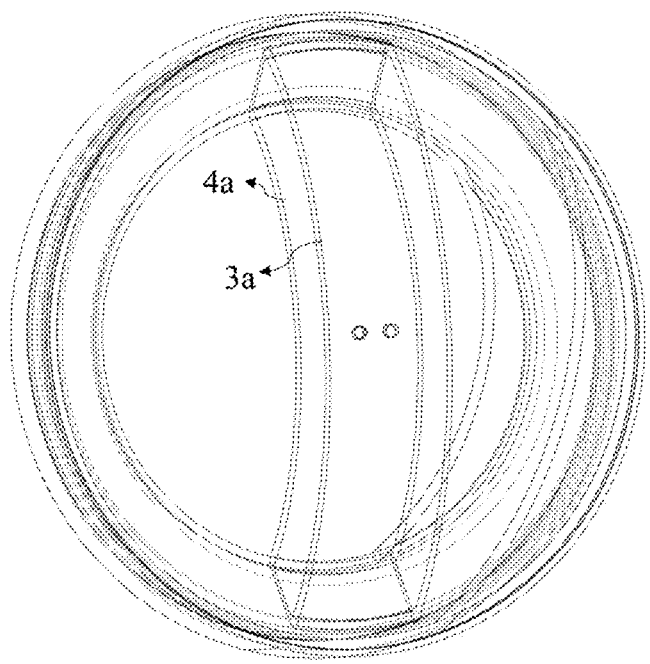
FIG. 12 is a three-dimensional structural diagram of the linear array microdisplay synchronously rotating with a strip-shaped concave reflector.

This implementation is described with reference to FIG. 11 and FIG. 12. The concave partial reflector 3 is configured as a strip-shaped partial reflector 3a, and the width thereof determines the exit pupil diameter, which is generally required to be larger than the human pupil, preferably within a range of 6 mm to 15 mm. The strip-shaped partial reflector 3a rotates synchronously with the linear array microdisplay 4a. In this case, the rotating structure for the linear array microdisplay 4a may be chosen from one of those in FIG. 9 and FIG. 10. An outer protective lens 11 is placed on the outer side of the strip-shaped partial reflector 3a. A rotating shaft 11-1 of the outer protective lens may also be provided at the center of the outer protective lens 11 to support rotation, which may be similarly made of a transparent material. Since the rotating shafts are arranged in the front and back, the stability of rotation can be improved. In this case, an axial magnetic fixing structure formed by the restricting magnetic ring 8 and the inner magnetic ring 4a-7 of the linear array microdisplay can be canceled, but maintaining the structure can further improve the stability. In particular, when the user moves, the angular momentum of a rotating member may be changed, a magnetic force of an outer ring tends to generate a large moment to change the angular momentum of the rotating structure. FIG. 12 is a three-dimensional structural diagram of the linear array microdisplay 4a synchronously rotating with the strip-shaped concave reflector 3a.

Figure 13:
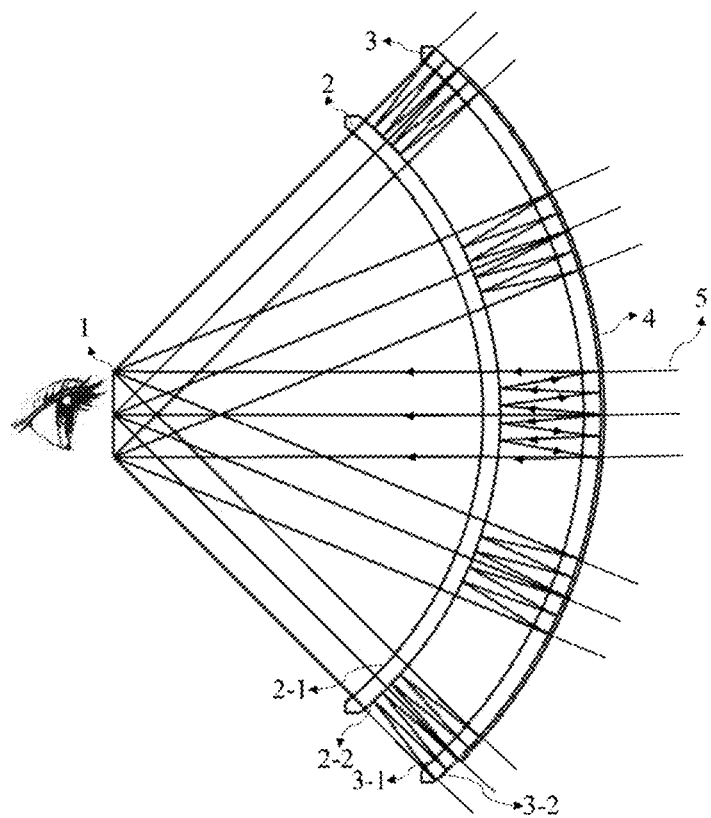
FIG. 13 is an optical path diagram of a portable short-focus near-eye display system with 4 reflections in which a microdisplay is provided on the right side of a concave partial reflector according to the present disclosure.

This implementation is described with reference to FIG. 13 to FIG. 16. As shown in FIG. 13, when the microdisplay 4 is located on the right side of the concave partial reflector 3, the microdisplay 4 emits light toward the pupil position 1, and the number of reflections of the light between the inner lens 2 and the concave partial reflector 3 is 4.

The light emitted by the microdisplay 4 first passes through the concave partial reflector 3 and reaches one surface of the inner lens 2. The one surface of the inner lens 2 is the concave surface 2-1 of the inner lens or the convex surface 2-2 of the inner lens, which has certain reflectivity and can reflect the light. The reflected light reaches the concave partial reflector 3 again. The concave partial reflector 3 reflects the light again, which is reflected again by one surface of the inner lens 2. Then, the light, after being reflected again by the concave partial reflector 3, passes through the inner lens 2 and reaches the human eye. The total number of reflections of the light back and forth between the inner lens 2 and the concave partial reflector 3 is 4.

Figure 14:
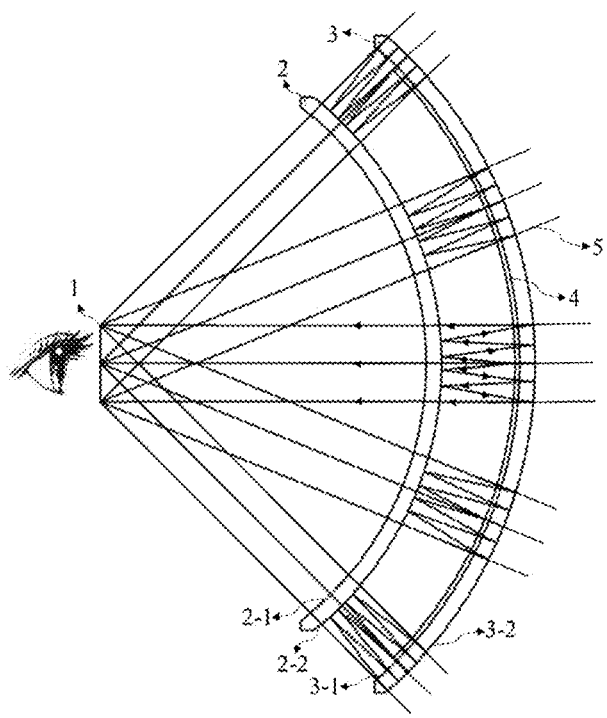
FIG. 14 is an optical path diagram of a portable short-focus near-eye display system with 4 reflections in which a microdisplay is provided on the left side of a concave partial reflector according to the present disclosure.
Figure 15:
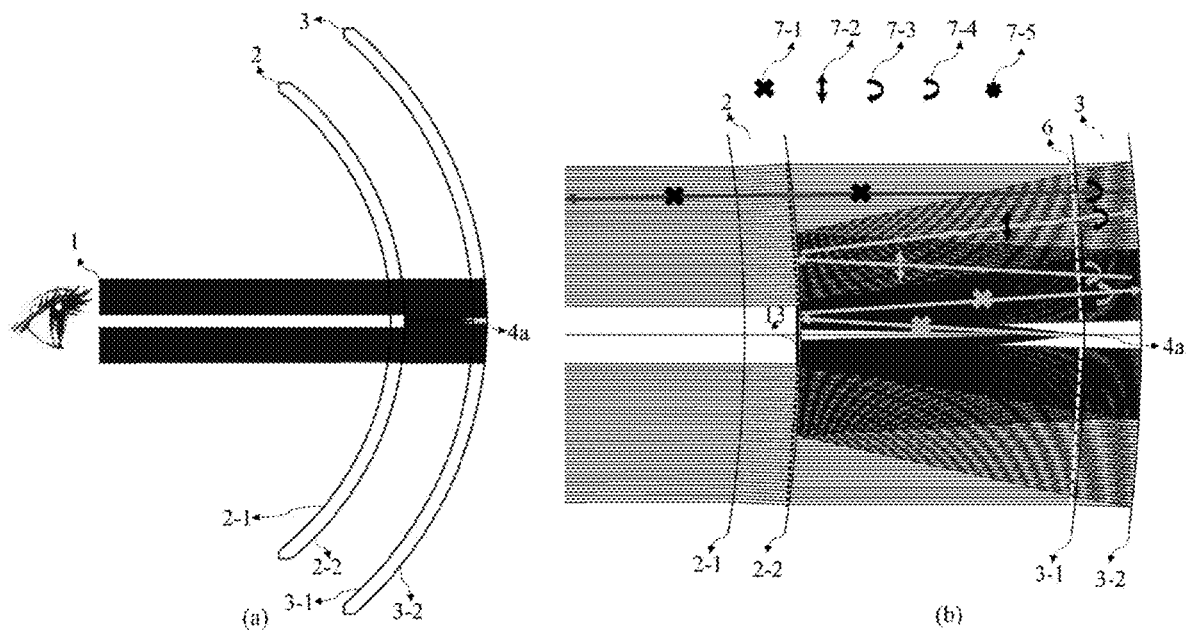
FIG. 15 is a schematic diagram showing a portable short-focus near-eye display system with 4 reflections improving reflection efficiency through a phase retardation wave plate according to the present disclosure.

As shown in FIG. 14, when the microdisplay 4 is located between the inner lens 2 and the concave partial reflector 3, the microdisplay 4 emits light toward the pupil position 1, and the number of reflections of the light between the inner lens 2 and the concave partial reflector 3 is 4.

The light emitted by the microdisplay 4 first reaches one surface of the inner lens 2. The one surface of the inner lens 2 is the concave surface 2-1 of the inner lens or the convex surface 2-2 of the inner lens, which has certain reflectivity and can reflect the light. The reflected light passes through the microdisplay 4 and reaches the concave partial reflector 3 again. The concave partial reflector 3 reflects the light again, which passes through the microdisplay 4 and is reflected again by one surface of the inner lens 2. Then, the light, after passing through the microdisplay 4 and being reflected again by the concave partial reflector 3, passes through the microdisplay 4 and the inner lens 2 again and reaches the human eye. The total number of reflections of the light back and forth between the inner lens 2 and the concave partial reflector 3 is 4.

Since the light is folded back and forth, light energy is constantly lost, and there may be some stray light. In order to alleviate the problem, as shown in FIG. 15(a), since the human pupil is generally larger than 3 mm, when there is a gap smaller than the pupil in the center, some light may reach the human eye for imaging. Based on the above principle, the inner lens 2 is configured with a strip shape in the same direction as the pixel arrangement of the linear array microdisplay 4a, which rotates synchronously with the linear array microdisplay 4a. The center of the inner lens 2 is coated with a strip-shaped central total reflection film 13, and the width of the central total reflection film 13 should be smaller than the diameter of the human pupil, preferably within a range of 0.5 mm to 1.5 mm.

As shown FIG. 15(b), on two sides of the central total reflection film 13, one surface of the inner lens 2, i.e., the concave surface 2-1 or the convex surface 2-2, is configured as a polarizing reflective surface that reflects one type of polarized light and transmits another type of polarized light with a polarization direction perpendicular to that of the reflected light. For example, a metal wire grid polarizing film has the above characteristics, which can be attached to a surface of an optical lens. A phase retardation plate 6 is added to the system to improve light energy efficiency. Preferably, the phase retardation wave plate 6 is a quarter-wave plate.

FIG. 15(b) is a schematic diagram of polarization changes when the linear array microdisplay 4 is located between the inner lens 2 and the concave partial reflector 13. The microdisplay 4 emits the s-type linearly polarized light 7-1, which is reflected by the strip-shaped central total reflection film 13, with the polarization property unchanged. The reflected light passes through the phase retardation wave plate 6 and becomes the second circularly polarized light 7-4, which, after being reflected by one surface of the concave partial reflector 3, changes in the circular polarization direction and becomes the first circularly polarized light 7-3. The first circularly polarized light 7-3 passes through the phase retardation wave plate 6 again and becomes the p-type linearly polarized light 7-2, and then is completely reflected by the polarizing reflective film attached to one surface of the inner lens 2, with the polarization property unchanged. The reflected light passes through the phase retardation wave plate 6 again and becomes the first circularly polarized light 7-3, which, after being reflected by one surface of the concave partial reflector 3, changes in the circular polarization direction and becomes the second circularly polarized light 7-4. The second circularly polarized light 7-4 passes through the phase retardation wave plate 6 again and becomes the s-type linearly polarized light 7-1. The s-type linearly polarized light 7-1 can completely pass through the polarizing reflective film and reach the pupil position 1. Therefore, a display effect with high efficiency and low stray light is achieved.

In this implementation, when the linear array microdisplay 4a is located on the right side of the concave partial reflector 3, only a polarization film layer is required to be placed in front of the linear array microdisplay 4a, so that the light arriving at the position of the central total reflection film 13 is the s-type linearly polarized light. The width of the polarization film layer should be small to prevent the passage of a large amount of light reflected by the central total reflection film 13, so that the light energy entering the human eye is reduced.

Figure 16:
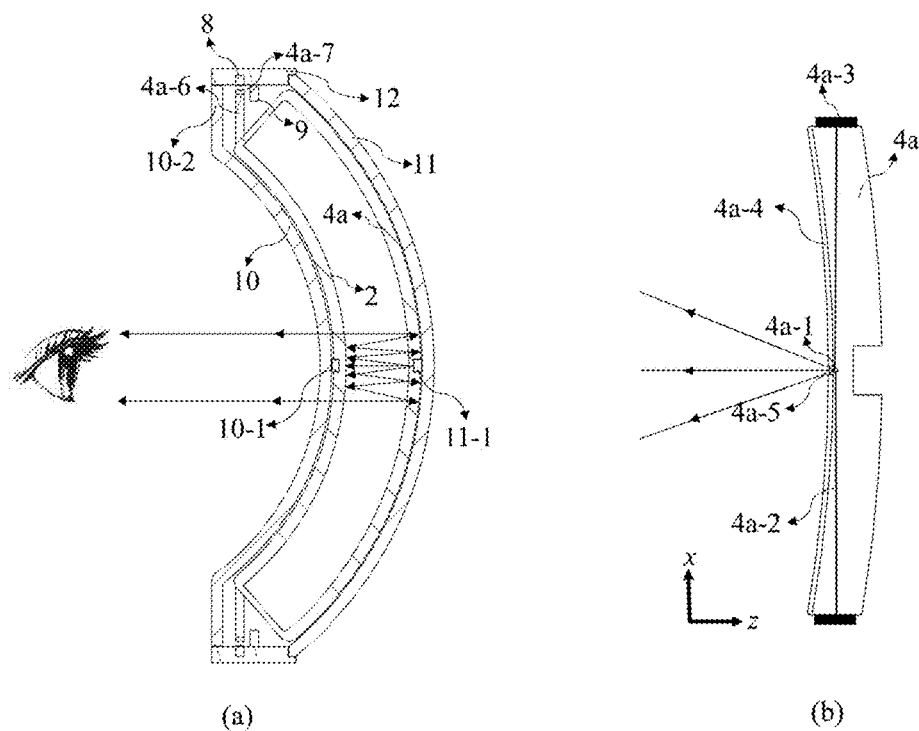
FIG. 16 is an assembly diagram of an optical path of the portable short-focus near-eye display system with 4 reflections according to the present disclosure; (a) is a schematic diagram of an optical path and an assembly when a microdisplay is on the left side of a concave partial reflector; and (b) is a schematic sectional view of an x-z plane of the linear array microdisplay.

This implementation is described with reference to FIG. 16. FIG. 16(a) is a schematic assembly diagram of a system according to this embodiment in which the light is reflected 4 times when the linear array microdisplay 4a is used. Since the linear array microdisplay 4a is required to synchronously rotate with the strip-shaped inner lens 2, there is a need to add the inner protective lens 10 on a side close to the human eye and add the outer protective lens 11 on a side away from the human eye. FIG. 16(b) is an x-z sectional view of the linear array microdisplay 4a, in which the regions 4a-4 on both sides of the light-emitting pixels may be configured as partial reflective surfaces so as to replace functions of the concave partial reflector 3. The inner protective lens 10 and the outer protective lens 11 may be each provided with a rotating shaft, so as to improve stability. The rotating shaft may be made of a transparent material to prevent shading.

In this implementation, in order to achieve uniformity of clarity of a displayed image, the inner lens 2, the concave partial reflector 3, and the microdisplay 4 are distributed on concentric spherical surfaces, and the spherical center is at the center of the pupil position 1. Since the human eye has a zoom adjustment function, a certain degree of movement of each component or change of a surface shape is allowed. An additional function of this movement is to adapt to a degree of myopia and realize dynamic zoom. For example, a relative distance between the inner lens 2 and the concave partial reflector 3 may be dynamically adjusted to realize dynamic zoom. Generally, the zoom function may be realized by arranging a voice coil motor.

Optical design parameters when a microdisplay 4 is between the inner lens 2 and the concave partial reflector 3 and the number of reflections is 4 are listed in the following table. The parameters start from a position of a virtual image. Since the positions and the shapes of the devices do not change during the folds, the parameters are only listed once.

| Surface label and surface type | Radius of curvature (mm) | Thickness (mm) | Material |
|---|---|---|---|
| Virtual image | ∞ | −1500 | — |
| Pupil position | ∞ | 21.2 | Air |
| 2-1 sphere | −21.2 | 1 | PMMA |
| 2-2 sphere | −22.2 | 5.06 | Coated reflective film, air |
| 3-1 sphere | −27.26 | 1 | PMMA |
| 3-2 sphere | −28.26 | −1.2 | Coated reflective film |
| 4 sphere | −27.06 | — | — |

Optical design parameters when a microdisplay 4 is on the right side of the concave partial reflector 3 and the number of reflections is 4 are listed in the following table. The parameters start from a position of a virtual image. Since the positions and the shapes of the devices do not change during the folds, the parameters are only listed once.

| Surface label and surface type | Radius of curvature (mm) | Thickness (mm) | Material |
|---|---|---|---|
| Virtual image | ∞ | −1500 | — |
| Pupil position | ∞ | 22.1 | Air |
| 2-1 sphere | −22.1 | 1 | Coated reflective film, PMMA |
| 2-2 sphere | −23.1 | 4.146 | Air |
| 3-1 sphere | −27.25 | 1 | PMMA |
| 3-2 sphere | −28.25 | 0.2 | Coated reflective film |
| 4 sphere | −28.45 | — | — |

If one surface of the inner lens 2 participates in the generation of a virtual image, the curvature of the other surface may be changed as a surface for myopia correction to suit the degree of the user. Two surfaces of the concave partial reflector 3 may be treated in the same manner to adjust the degree.

In order to improve energy utilization, one surface of the concave partial reflector 3 may be coated with a reflective filter film. The film is designed according to the light-emitting wavelength of the microdisplay 4. The reflective filter film has high reflectivity for a light-emitting central wavelength of the microdisplay 4, for example, more than 90%, and has high transmittance for wavelengths other than the light-emitting central wavelength, for example, more than 90%. Such a design can improve the brightness of both the ambient light and the virtual image. The reflective filter film may be a dielectric film layer, a dielectric metal composite film layer, a holographic film layer, or a microstructure film layer.

Figure 17:
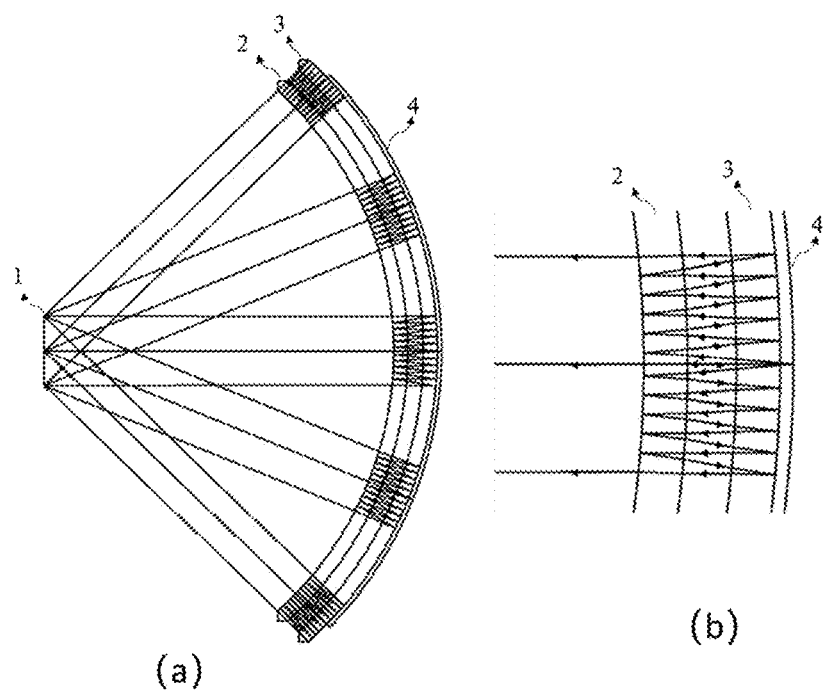
FIG. 17 is a schematic diagram of polarization changes in an optical path with more than 4 reflections, in which the direction of reflected circularly polarized light is dynamically changed according to the present disclosure; (a) is a diagram of the optical path, in which the direction of reflected circularly polarized light is dynamically changed; and (b) is a partial enlarged view of an optical path among the inner lens, the concave partial reflector, and the microdisplay.

This implementation is described with reference to FIG. 17 to FIG. 20. As shown in FIG. 17, the light emitted by the microdisplay 4 is reflected back and forth between the concave partial reflector 3 and the inner lens 2 at least 5 times, and then passes through the inner lens 2 to reach the human eye. When the microdisplay 4 is arranged between the inner lens 2 and the pupil position 1, the microdisplay 4 emits light away from the pupil position, and the number of reflections of the light emitted by the microdisplay 4 between the inner lens 2 and the concave partial reflector 3 is an odd number greater than or equal to 5, such as 7, 9, or 11.

When the microdisplay 4 is arranged between the inner lens 2 and the concave partial reflector 3, the microdisplay 4 may emit light away from the pupil position 1 or toward the pupil position 1. When the light is emitted away from the pupil position 1, the number of reflections of the light emitted by the microdisplay 4 between the inner lens 2 and the concave partial reflector 3 is an odd number greater than or equal to 5, such as 7, 9, or 11. When the light is emitted toward the pupil position 1, the number of reflections of the light emitted by the microdisplay 4 between the inner lens 2 and the concave partial reflector 3 is an even number greater than or equal to 6, such as 6, 8, or 10.

When the microdisplay 4 is arranged on the right side of the concave partial reflector 3, the microdisplay 4 emits light toward the pupil position 1, and the number of reflections of the light emitted by the microdisplay 4 between the inner lens 2 and the concave partial reflector 3 is an even number greater than or equal to 6, such as 6, 8, or 10.

One surface of the inner lens 2 is configured as a switchable mirror. The microdisplay 4 is controlled to emit pulsed light. When the number of reflections does not reach a set number (such as 8), the switchable mirror reflects the light, and when the number of reflections reaches the set number, the switchable mirror becomes transmissive to transmit the light to the human eye. In this optical manner, the thickness can be further reduced.

In this implementation, when the number of reflections of the light between the inner lens 2 and the concave partial reflector 3 is more than 4, one surface of the inner lens 2 may be configured as a polarizing reflective surface, a phase retardation wave plate 6 is added between the inner lens 2 and the concave partial reflector 3, a partial reflective surface of the concave partial reflector 3 is configured as a surface that dynamically adjusts a reflection circular polarization direction, the microdisplay 4 is controlled to emit pulsed circularly polarized light, and the concave partial reflector 3 is configured to keep a reflection circular polarization direction unchanged. When the number of light reflections reaches the set number, the partial reflective surface of the concave partial reflector 3 becomes an ordinary mirror, and the light, after being reflected by the ordinary mirror, enters the human eye.

Figure 18:
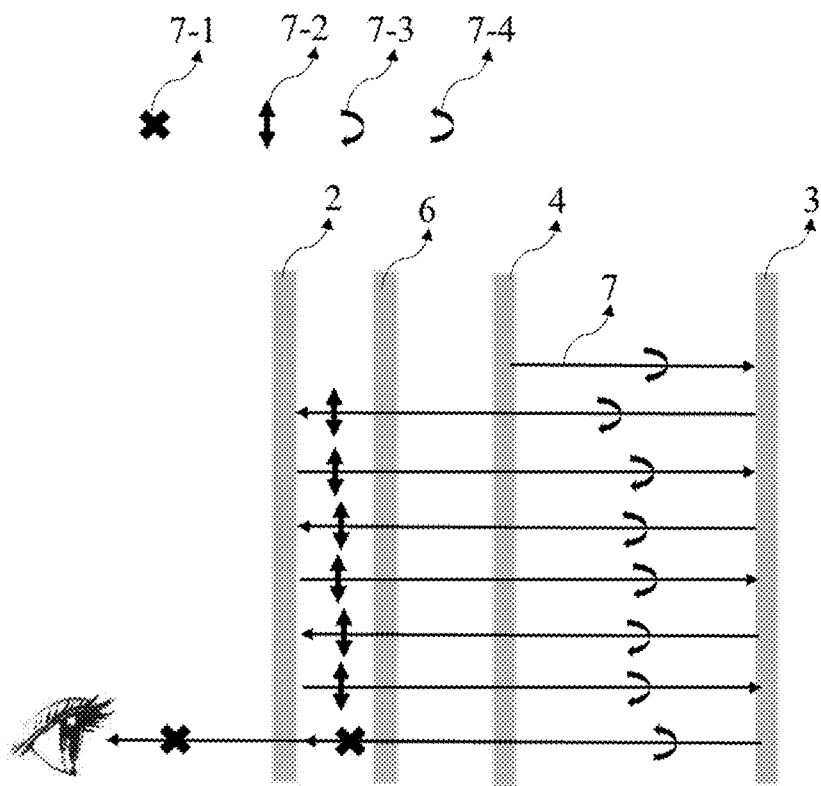
FIG. 18 is an optical path diagram of a portable short-focus near-eye display system with more than 4 reflections according to the present disclosure.

FIG. 18 is a diagram showing optical path and polarization changes when the partial reflective surface of the concave partial reflector 3 is configured to dynamically adjust the reflection circular polarization direction. At present, the function of dynamically adjusting the reflection circular polarization direction can be realized through metasurface technology. The microdisplay 4 emits short-pulse first circularly polarized light 7-3. At this time, the concave partial reflector 3 is configured to keep a reflection circular polarization direction unchanged. The light, after being reflected, passes through the phase retardation wave plate 6 and becomes the p-type linearly polarized light 7-2. The p-type linearly polarized light 7-2 is completely reflected by the polarizing reflective film on the inner lens 2, passes through the phase retardation wave plate 6, and is then still the first circularly polarized light 7-3. After the light is reflected back and forth the designed times such as 8 times, the partial reflective surface of the concave partial reflector 3 becomes a normal mirror surface. After the reflection, the circular polarization direction is reversed and becomes the second circularly polarized light 7-4, which finally passes through the phase retardation wave plate 6 and becomes s-type linearly polarized light that passes through the inner lens 2 and enters the human eye.

Optical design parameters for a system with multiple reflections shown in FIG. 17 are listed in the following table. The parameters in the table correspond to a situation where the microdisplay 4 is located between the inner lens 2 and the concave partial reflector 3. The parameters start from a position of a virtual image. Since the positions and the shapes of the devices do not change during the folds, the parameters are only listed once.

| Surface label and surface type | Radius of curvature (mm) | Thickness (mm) | Material |
|---|---|---|---|
| Virtual image | ∞ | −1500 | — |
| Pupil position | ∞ | 24.764 | Air |
| 2-1 sphere | −24.764 | 1 | PMMA, coated reflective film |
| 2-2 sphere | −25.764 | 1.236 | Air |
| 3-1 sphere | −27 | 1 | PMMA |
| 3-2 sphere | −28 | −0.2 | Coated reflective film |
| 4 sphere | −27.385 | — | — |

This implementation is described with reference to FIG. 19 and FIG. 20. When the number of folds increases, since the distance between the inner lens 2 and the concave partial reflector 3 is very small, they may be combined as an integrated lens 14. The microdisplay 4 may be placed on the left side or right side of the integrated lens 14. The light, after being reflected back and forth between an inner surface 14-1 of the integrated lens and an outer surface 14-2 of the integrated lens a set number of times such as 8 times, enters the human eye through the inner surface 14-1 of the integrated lens.

In this implementation, in order to achieve uniformity of clarity of a displayed image, the integrated lens 14 and the microdisplay 4 are distributed on concentric spherical surfaces, and the spherical center is at the center of the pupil position 1. Since the human eye has a zoom adjustment function, a certain degree of movement of each component or change of a surface shape is allowed. An additional function of this movement is to adapt to a degree of myopia and realize dynamic zoom. Generally, the zoom function can be implemented by arranging a voice coil motor.

Figure 19:
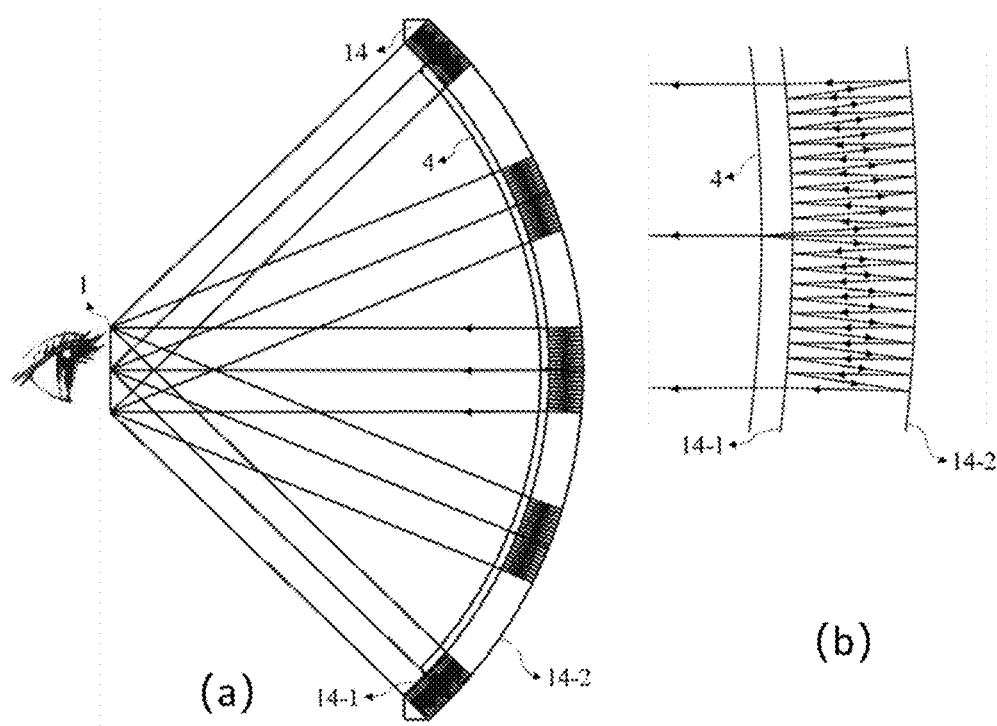
FIG. 19 is an optical path diagram of a portable short-focus near-eye display system with more than 4 reflections in which an integrated lens is used and a microdisplay is provided on the left side of the integrated lens according to the present disclosure; (a) is a schematic diagram showing that the microdisplay is arranged on the left side of the integrated lens; and (b) is a partial enlarged view of a direction of the optical path.
Figure 20:
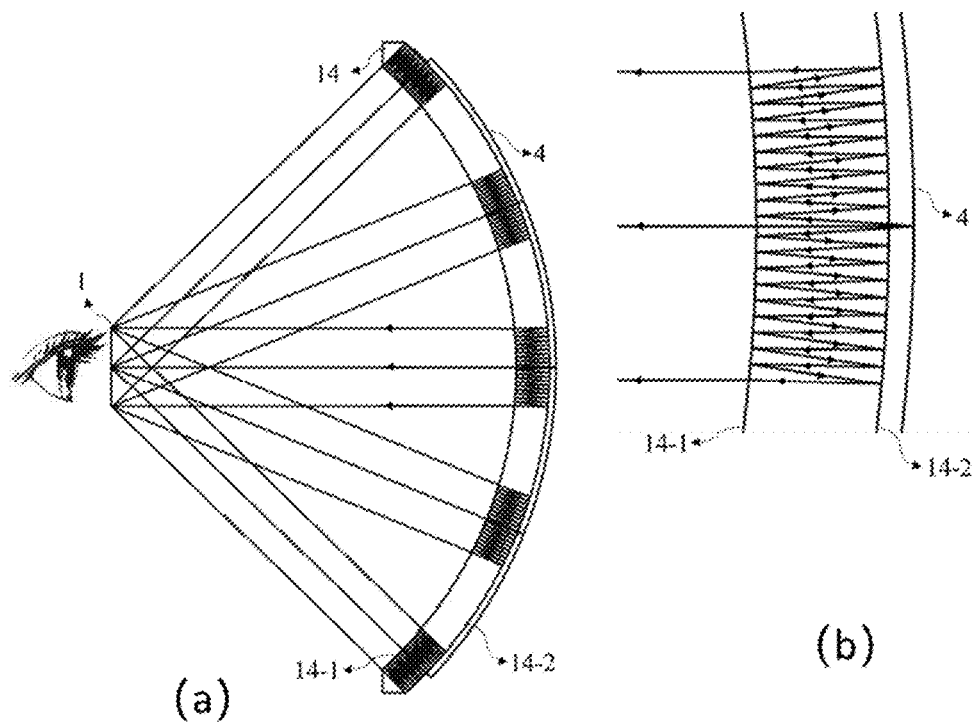
FIG. 20 is an optical path diagram of a portable short-focus near-eye display system with more than 4 reflections in which an integrated lens is provided and a microdisplay is provided on the right side of the integrated lens according to the present disclosure; (a) is a schematic diagram showing the microdisplay is arranged on the right side of the integrated lens; and (b) is a partial enlarged view of a direction of the optical path.

Optical design parameters for a system shown in FIG. 19 are listed in the following table. Data in the table indicates that the microdisplay 4 is located on the left side of the integrated lens 14. The parameters start from a position of a virtual image. Since the positions and the shapes of the devices do not change during the folds, the parameters are only listed once.

| Surface label and surface type | Radius of curvature (mm) | Thickness (mm) | Material |
|---|---|---|---|
| Virtual image | ∞ | −1500 | — |
| Pupil position | ∞ | 26.005 | Air |
| 13-1 sphere | −26.005 | 2.014 | PMMA |
| 13-2 sphere | −28.019 | −2.514 | Coated reflective film |
| 4 sphere | −25.504 | — | — |

In order to improve energy utilization after multiple folds and reduce stray light, firstly, the inner surface 14-1 of the integrated lens may be configured as a switchable mirror, and transmission or reflection of the switchable mirror may be electronically controlled. The microdisplay 4 emits pulsed light. When the number of reflections does not reach the set number, the switchable mirror can reflect the light, and when the number of reflections reaches the set number, the switchable mirror becomes transmissive to transmit the light into the human eye. An effect with high efficiency and low stray light can be achieved.

In the present disclosure, terms "include" and "have" and any variations thereof are intended to cover non-exclusive inclusion. For example, a system, product or device including a series of units is not necessarily limited to those units explicitly listed, but may include other units that are not clearly listed or are inherent to the product or device.

The technical features in the above embodiments may be randomly combined. For a concise description, not all possible combinations of the technical features in the above embodiments are described. However, all the combinations of the technical features are to be considered as falling within the scope described in this specification provided that they do not conflict with each other.

The above embodiments only describe several implementations of the present disclosure, and their description is specific and detailed, but cannot therefore be understood as a limitation on the patent scope of the invention. It should be noted that those of ordinary skill in the art may further make variations and improvements without departing from the conception of the present disclosure, and these all fall within the protection scope of the present disclosure. Therefore, the patent protection scope of the present disclosure should be subject to the appended claims.

Depending on various embodiments of the present disclosure, the following beneficial effects are provided.

According to the display system in the present disclosure, when the number of reflections between the inner lens and the concave partial reflector is 3, due to fold of an optical path, the lens is thinner and more compact, and an exit pupil distance is further increased. A high-efficiency display can be realized by adding a phase retardation wave plate and a reflective polarizer. When the number of reflections is 4, the thickness can be further reduced, and the size of the microdisplay can be enlarged, making it easy to manufacture the microdisplay. An advantage of further increasing the number of reflections is that the thickness of the system can be continuously reduced.

According to the portable short-focus near-eye display system provided in the present disclosure, through multiple reflections and the folded light path, the overall thickness of glasses can be reduced, and the exit pupil distance can be increased so that users will experience increased comfort and enhanced aesthetics when wearing it.

Through the special design of the linear array microdisplay in the present disclosure, light energy losses caused by central shading can be reduced, and shading of a central shaft can be eliminated by using a transparent rotating shaft.

Through synchronous rotation of the linear array display and the strip-shaped concave reflector, the transmittance of ambient light can be greatly improved, and ambient brightness can be improved.

What is claimed is:

1. A portable short-focus near-eye display system, comprising:
   a microdisplay,
   an inner lens, and
   a concave partial reflector;
   wherein the inner lens is closer to a pupil position, the concave partial reflector is farther away from the pupil position, the microdisplay comprises a rotating linear array microdisplay or a transparent microdisplay, and the inner lens is a convex reflector;
   wherein the microdisplay is arranged between the inner lens and the pupil position, or arranged between the inner lens and the concave partial reflector, or arranged on a convex side of the concave partial reflector;
   when the microdisplay is arranged between the inner lens and the pupil position, the microdisplay emits light away from the pupil position, and a number of reflections of the light emitted by the microdisplay between the inner lens and the concave partial reflector is greater than or equal to 3;
   when the microdisplay is arranged between the inner lens and the concave partial reflector, the microdisplay emits light away from the pupil position or toward the pupil position, and a number of reflections of the light emitted by the microdisplay between the inner lens and the concave partial reflector is greater than or equal to 3; and
   when the microdisplay is arranged on the convex side of the concave partial reflector, the microdisplay emits light toward the pupil position, and a number of reflections of the light emitted by the microdisplay between the inner lens and the concave partial reflector is greater than or equal to 4.

2. The portable short-focus near-eye display system according to claim 1, wherein
   a concave surface or a convex surface of the inner lens is configured as a polarizing reflective surface, a phase retardation plate is added between the inner lens and the concave partial reflector, an ambient light circular polarizer is arranged on the convex side of the concave partial reflector, the ambient light circular polarizer is configured to change natural ambient light into first circularly polarized ambient light, and the first circularly polarized ambient light, after passing through the phase retardation plate, becomes s-type linearly polarized ambient light and enters a human eye.

3. The portable short-focus near-eye display system according to claim 1, wherein
   the number of reflections of the light emitted by the microdisplay between the inner lens and the concave partial reflector is set to 3, and a concave surface or a convex surface of the inner lens is configured as a polarizing reflective surface;
   when the microdisplay is located between the inner lens and the concave partial reflector, a phase retardation wave plate is placed between the microdisplay and the inner lens; and
   when the microdisplay is arranged between the inner lens and the pupil position, a phase retardation wave plate is placed between the inner lens and the concave partial reflector.

4. The portable short-focus near-eye display system according to claim 1, wherein
   the linear array microdisplay comprises light-emitting pixels transparent wires, and a display driver chip, the transparent wires connect the light-emitting pixels and the display driver chip, and a distance between the light-emitting pixels and the display driver chip is greater than 1 mm;
   the light-emitting pixels are arranged in a manner of a line, half of a line, two lines in a cross-shaped arrangement, or four lines in a *-shaped arrangement; and
   regions on both sides of the light-emitting pixels are configured as transparent regions, partial reflective surfaces, or polarizing reflective surfaces; the regions on both sides of the light-emitting pixels, when being the partial reflective surfaces, replace the concave partial reflector; and the regions on both sides of the light-emitting pixels, when being the polarizing reflective surfaces, replace the inner lens.

5. The portable short-focus near-eye display system according to claim 4, wherein
   the number of reflections of the light emitted by the microdisplay between the inner lens and the concave partial reflector is set to 3, the concave partial reflector is configured as a strip-shaped partial reflector that synchronously rotates with the linear array microdisplay, and an outer protective lens is placed on one side of the strip-shaped partial reflector.

6. The portable short-focus near-eye display system according to claim 4, wherein
   the number of reflections of the light emitted by the microdisplay between the inner lens and the concave partial reflector is set to 4, a concave surface or a convex surface of the inner lens is configured as a polarizing reflective surface, the inner lens is configured with a strip shape in a same direction as pixel arrangement of the linear array microdisplay, the concave partial reflector is configured as a strip-shaped partial reflector, and the inner lens, the strip-shaped partial reflector, and the linear array microdisplay rotate synchronously;
   a center of the inner lens is coated with a strip-shaped central total reflection film, and a width of the central total reflection film is smaller than a diameter of a human pupil; and
   a phase retardation wave plate is placed between the inner lens and the strip-shaped partial reflector, and a polarization film layer is placed in front of the light-emitting pixels of the linear array microdisplay.

7. The portable short-focus near-eye display system according to claim 6, wherein
   the regions on both sides of the light-emitting pixels of the linear array microdisplay are configured as the partial reflective surfaces for replacing the strip-shaped partial reflector, the linear array microdisplay rotates synchronously with the inner lens, an inner protective lens is added to a left side of the inner lens, and an outer protective lens is added to a side of the linear array microdisplay away from the pupil; and the inner protective lens and the outer protective lens are each provided with a rotating shaft.

8. The portable short-focus near-eye display system according to claim 1, wherein when the number of reflections of the light emitted by the microdisplay between the inner lens and the concave partial reflector is more than 4, one surface of the inner lens is configured as a polarizing reflective surface, a phase retardation wave plate is placed between the inner lens and the concave partial reflector, a partial reflective surface of the concave partial reflector is configured as a surface that dynamically adjusts a reflection circular polarization direction, the microdisplay is controlled to emit pulsed circularly polarized light, the concave partial reflector is configured to keep the reflection circular polarization direction unchanged, the partial reflective surface of the concave partial reflector is configured as an ordinary mirror when the number of light reflections reaches a set number, and the light, after being reflected by the ordinary mirror, enters a human eye.

9. The portable short-focus near-eye display system according to claim 1, wherein when the number of reflections of the light emitted by the microdisplay between the inner lens and the concave partial reflector is more than 4, one surface of the inner lens is configured as a switchable mirror, the microdisplay is controlled to emit pulsed light, the switchable mirror reflects the light when the number of reflections does not reach a set number, and the switchable mirror becomes transmissive to transmit the light into a human eye when the number of reflections reaches the set number.

10. The portable short-focus near-eye display system according to claim 9, wherein the inner lens and the concave partial reflector are combined as an integrated lens, the microdisplay is configured to emit light toward one side of the integrated lens, and an inner surface of the integrated lens is configured as a switchable mirror; and the light emitted by the microdisplay is reflected between the inner surface of the integrated lens and an outer surface of the integrated lens, and the light enters the human eye through the inner surface of the integrated lens when the number of reflections reaches a set number.

* * * * *